United States Patent [19]

Krejcir et al.

[11] Patent Number: 4,706,923
[45] Date of Patent: Nov. 17, 1987

[54] RESILIENT MOUNTING OF A CENTRIFUGE

[75] Inventors: Oldrich Krejcir, Liberec; Bohuslav Zajic; Pavel Saroun, both of Hradec Kralove, all of Czechoslovakia

[73] Assignee: Vysoka skola strojni a textilni, Liberec, Czechoslovakia

[21] Appl. No.: 842,444

[22] Filed: Mar. 21, 1986

[51] Int. Cl.⁴ ............................................. F16M 1/00
[52] U.S. Cl. .................................. 248/638; 248/550; 248/631; 248/654; 267/64.28
[58] Field of Search ............... 248/638, 603, 631, 654, 248/550; 267/64.28, 64.16, 122

[56] References Cited

U.S. PATENT DOCUMENTS

| | | | |
|---|---|---|---|
| 3,090,586 | 5/1963 | Schwegler et al. | 248/638 X |
| 3,112,922 | 12/1963 | Musschoot | 248/631 X |
| 3,351,027 | 11/1967 | Ellard et al. | 248/631 X |
| 3,797,140 | 3/1974 | McWilliams et al. | 267/64.16 X |
| 3,854,710 | 12/1974 | Nicholls | 267/64.16 X |
| 4,257,580 | 3/1981 | Schnitzius | 267/64.28 |
| 4,405,101 | 9/1983 | Carlson et al. | 248/638 X |
| 4,489,991 | 12/1984 | Delam | 248/638 X |
| 4,550,899 | 11/1985 | Holley | 267/64.28 X |
| 4,565,039 | 1/1986 | Oguro et al. | 248/638 X |
| 4,589,620 | 5/1986 | Sakamoto | 248/550 |

Primary Examiner—Ramon O. Ramirez

[57] ABSTRACT

A resilient mounting of a centrifuge that is a pneumatic one is made in a stand between the subsurface and supporting frame of the centrifuge by means of at least three vibration insulating units, each of which is provided with at least one pneumatic spring connected to a source of pressurized air through an automatic controller of a constant static height and having at least three vibration dampers. In a preferred embodiment, the resilient mounting of a centrifuge has three controllers of constant static height and vibration dampers which are seated obliquely.

4 Claims, 1 Drawing Figure

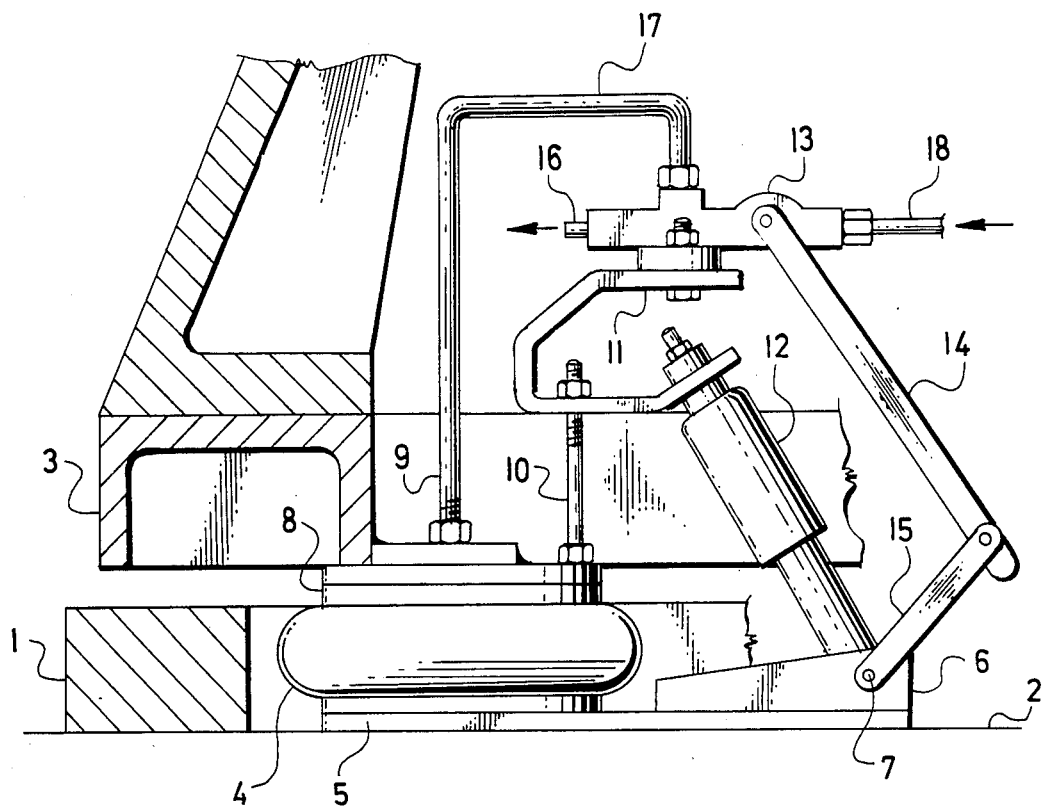

RESILIENT MOUNTING OF A CENTRIFUGE

The invention relates to a resilient mounting of a centrifuge.

DESCRIPTION OF PRIOR ART

Prior known frames of centrifuges, which have intensive vibrations during the operation of the centrifuge, are fixed by means of anchoring screws either to concrete bases or directly to the subsurface. Sometimes the frames are seated on rubber or other vibration insulating layers, eventually they are seated on rubber springs or steel ones. All these methods of seating, transmit vibrations to the subsurface, which effect negatively on building structures and other nearby equipment. In addition, these prior known frames worsen the working environment by increasing noises and vibrations which are extremely intensive if the centrifuges are situated on higher floors.

SUMMARY OF THE INVENTION

Some of these above-mentioned drawbacks maybe be obviated by a resilient mounting of a centrifuge, the frame of the centrifuge being seated on a subsurface in an elastic way. The principle of the present invention lies in the fact that at least three vibration insulating units are situated between the supporting frame and the subsurface. Each of the said units consists of at least one pneumatic spring, connected to a controller of a static height and of at least three vibration dampers. In a further embodiment of the invention, the equipment may comprise three controllers of static height. In an additional embodiment, the vibration dampers may be seated obliquely with respect to the axes of the centrifuge.

The main advantage of the resilient mounting of a centrifuge, according to the present invention, lies in the fact that the pneumatic springs, connected to a source of pressurized air through automatic controllers of a static height, keep the frame of the centrifuge at variable doses of filling in a constant distance from the subsurface. This prevents, with high efficiency, vibrations from being transmitted from the frame of the centrifuge into the subsurface and thereby to parts of the building and into other equipment. This allows for an improved working environment because the noise is decreased due to the fact that the vibrations do not affect any acoustically resonating parts of the building and equipment. Three automatic controllers of a constant static height, usually automatic ones are easily adjustable as to the distance of the frame of the centrifuge over the subsurface. If the centrifuge is working with a nonuniformly circumferentially situated filling, horizontal and vertical forces, that is, dynamic ones, affect the frame. Obliquely seated vibration dampers absorb the power of the vibrating motion of the frame.

In order that the invention may be clearly understood and readily carried into effect, a preferred embodiment thereof, is by way of example hereinafter more fully described and illustrated in the accompanying drawing in which a cross section of one of three corners of the centrifuge, with a stand on a subsurface, is shown.

BRIEF DESCRIPTION OF A DRAWING AND A PREFERRED EMBODIMENT

In a stand 1 of a centrifuge between a subsurface 2 and supporting frame 3 of the centrifuge, there is situated in each of three corners a single wave pneumatic spring 4. It is provided with a flat lower closing cover 5 and a holder 6 to which a pin 7 is attached and with an upper closing cover 8 with a drill through fixing center screw 9. A holder 11 of a vibration damper is fixed to the upper surface of the supporting frame 3 by means of a couple of screws 10. The holder 11 of the vibration damper is obliquely seated, by its lower end, on damper 12 which is attached by pin 7 to holder 6. On the upper surface of holder 11 there is also fixed a controller 13 of a constant static height, which is automatic in the preferred embodiment. An end of a control lever 14 of this controller 13 is connected to the pin 7 by means of a pull rod 15. The controller 13 is provided with an outlet 16 directed into the atmosphere, with an outlet 17 connected to the pneumatic spring 4, and with an inlet 18 connected to a source of pressurized air.

If distances of the supporting frame 3 of the centrifuge are changed because of changes of the filling, one deflects the swing control lever 14 on the controller 13 by means of the pull rod 15. The said swing control lever 14 control the valve system for filling and discharging the connected pneumatic spring 4. When filling, compressed air passes from the source through the controller 13 and outlet 17 into the pneumatic spring 4. When discharging, it flows from the pneumatic spring 4 through the controller 13 and outlet 16 into the atmosphere. That is why the static height of the pneumatic spring 4, at a variable filling in the centrifuge, is constant. When the centrifuge is not working, and there is no pressurized air in the source, the base of the supporting frame 3 of the centrifuge stays on the stand 1 of the subsurface 2. If the centrifuge is operating, the supporting frame 3 is carried by pneumatic springs 4, which prevent vibrations from being transmitted into the subsurface 2. The obliquely seated vibration dampers 12 absorb the power of the vibrating motion of the frame 3, which is originated during the operation because of nonuniform circumferential displacement of the filling.

Although the invention is illustrated and described with reference to one preferred embodiment thereof, it is to be expressly understood that it is in no way limited to the disclosure of such preferred embodiment, but it capable of numerous modifications within the scope of the appended claims.

We claim:

1. A resilient mounting of a centrifuge having a supporting frame, the supporting frame of the centrifuge being seated on a subsurface in an elastic way, comprising at least three vibration insulating units situated between the supporting frame and the subsurface, wherein each of said units consists of at least one pneumatic spring;

a controller of static height;

at least one vibration damper, wherein the pneumatic spring is connected to a source of pressurized air via said controller of static height, and the vibration damper absorbs vibrations of the working frame of the centrifuge.

2. A resilient mounting of a centrifuge according to claim 1, wherein there are three controllers of a static height.

3. A resilient mounting of a centrifuge according to claim 2, wherein the said vibration dampers are seated obliquely with respect to the axes of the centrifuge.

4. A resilient mounting of a centrifuge according to claim 1, wherein the controller is automatic.

* * * * *